United States Patent
Nakagawa et al.

(10) Patent No.: US 8,507,627 B2
(45) Date of Patent: Aug. 13, 2013

(54) AROMATIC VINYL COMPOUND-CONJUGATED DIENE COMPOUND COPOLYMER AND METHOD OF PRODUCING THE SAME AS WELL AS RUBBER COMPOSITION AND TIRE

(75) Inventors: Ryuji Nakagawa, Kodaira (JP); Junko Matsushita, Tachikawa (JP); Yoichi Ozawa, Kodaira (JP); Shojiro Kaita, Tokyo (JP); Olivier Tardif, Wako (JP)

(73) Assignees: Bridgestone Corporation, Tokyo (JP); Riken, Saitama (JP)

( * ) Notice: Subject to any disclaimer, the term of this patent is extended or adjusted under 35 U.S.C. 154(b) by 0 days.

(21) Appl. No.: 12/996,252

(22) PCT Filed: Jun. 4, 2009

(86) PCT No.: PCT/JP2009/060291
§ 371 (c)(1),
(2), (4) Date: Feb. 18, 2011

(87) PCT Pub. No.: WO2009/148140
PCT Pub. Date: Dec. 10, 2009

(65) Prior Publication Data
US 2011/0136995 A1    Jun. 9, 2011

(30) Foreign Application Priority Data

Jun. 4, 2008 (JP) ................................. 2008-147015

(51) Int. Cl.
*C08F 4/52* (2006.01)
(52) U.S. Cl.
USPC ........... 526/340; 526/133; 526/160; 526/161; 526/164; 526/943
(58) Field of Classification Search
USPC .................. 526/133, 160, 161, 164, 340, 943
See application file for complete search history.

(56) References Cited

U.S. PATENT DOCUMENTS

| | | | | |
|---|---|---|---|---|
| 6,596,828 B1 * | 7/2003 | Kaito et al. | ................. | 526/164 |
| 7,148,299 B2 * | 12/2006 | Kaita et al. | ................. | 526/164 |
| 2003/0018144 A1 | 1/2003 | Kaita et al. | | |
| 2003/0166458 A1 | 9/2003 | Kaita et al. | | |
| 2009/0264604 A1 * | 10/2009 | Kaita et al. | ................. | 526/126 |

FOREIGN PATENT DOCUMENTS

| | | |
|---|---|---|
| JP | 2000-154210 A | 6/2000 |
| JP | 2001-64313 A | 3/2001 |
| JP | 3207502 B2 | 7/2001 |
| JP | 2002-069117 A | 3/2002 |
| JP | 2003-301073 A | 10/2003 |
| JP | 3738315 B2 | 11/2005 |
| JP | 2006-137897 A | 6/2006 |
| JP | 2006-137898 A | 6/2006 |
| JP | 2007-63240 A | 3/2007 |
| WO | 2007/129670 A1 | 11/2007 |

OTHER PUBLICATIONS

Extended European Search Report issued Oct. 14, 2011, in European Patent Application No. 09758407.2.
Shojiro Kaida et al., "Kidorui Metallocen Shokubaikei ni yoru Styrene to Butadeine no Kyojugo -Kobunshi Ryotai Haishisu SBR no Gose-", Polymer Preprints, Japan, May 10, 2004, vol. 53, No. 1, p. 221, ID19.
First Office Action issued Apr. 12, 2012 in Chinese Patent Application No. 200980129801.5 with English translation.
Office Action issued Jul. 9, 2012, in European Patent Application No. 09758407.2.
Korean Office Action dated Aug. 8, 2012 issued in corresponding Korean Patent Application No. 10-2011-7000022.
Office Action dated Dec. 12, 2012 from the People's Republic of China Patent Office in a counterpart Chinese Application No. 200980129801.5.

\* cited by examiner

*Primary Examiner* — Caixia Lu
(74) *Attorney, Agent, or Firm* — Sughrue Mion, PLLC

(57) ABSTRACT

This invention relates to an aromatic vinyl compound-conjugated diene compound copolymer capable of giving excellent wear resistance and resistance to wet skid to a tire, and more particularly to an aromatic vinyl compound-conjugated diene compound copolymer obtained by an addition polymerization of an aromatic vinyl compound and a conjugated diene compound in the presence of a polymerization catalyst composition comprising at least one specified metallocene complex selected from the group consisting of a metallocene complex represented by the following general formula (I):

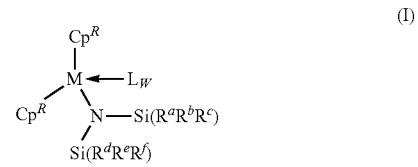

(wherein M is a lanthanoid element, scandium or yttrium, and $Cp^R$ is independently a non-substituted or substituted indenyl, and $R^a$ to $R^f$ are independently an alkyl group having a carbon number of 1-3 or a hydrogen atom, and L is a neutral Lewis base, and w is an integer of 0-3) and so on, wherein a content of cis-1,4 bond in a conjugated diene compound portion is not less than 80%.

9 Claims, No Drawings

AROMATIC VINYL COMPOUND-CONJUGATED DIENE COMPOUND COPOLYMER AND METHOD OF PRODUCING THE SAME AS WELL AS RUBBER COMPOSITION AND TIRE

CROSS REFERENCE TO RELATED APPLICATION

This application is a National Stage of International Application No. PCT/JP2009/060291 filed Jun. 4, 2009, claiming priority based on Japanese Patent Application No. 2008-147015, filed Jun. 4, 2008, the contents of all of which are incorporated herein by reference in their entirety

TECHNICAL FIELD

This invention relates to an aromatic vinyl compound-conjugated diene compound copolymer and a method of producing the same as well as a rubber composition and a tire using the copolymer, and more particularly to an aromatic vinyl compound-conjugated diene compound copolymer capable of using in a tread to give excellent wear resistance and resistance to wet skid to a tire.

RELATED ART

An aromatic vinyl compound-conjugated diene compound copolymer such as styrene-butadiene copolymer or the like is synthesized by a polymerization with a conventional anion or radical initiator or the like. As 1,4-structure, which is one of isomeric structures in a conjugated diene compound portion, is commonly included most of a trans-1,4-structure. In the isomeric structure in the conjugated diene compound portion, it is also difficult to control a structure other than a vinyl bond content.

On the other hand, in order to control a stereoregularity in the conjugated diene compound portion such as content of cis-1,4-structure, there is known a method of producing an aromatic vinyl compound-conjugated diene compound copolymer with a metal catalyst comprising a ligand and a metal atom (e.g. see Japanese Patent No. 3207502, JP-A-2006-137897 and Japanese Patent No. 3738315). However, the aromatic vinyl compound-conjugated diene compound copolymer obtained by this method may have problems such as blocking of an aromatic vinyl compound portion, formation of low molecular weight polymer and so on.

SUMMARY OF THE INVENTION

As a result of the inventors' examinations, it has been found that an aromatic vinyl compound-conjugate diene compound copolymer having a high cis-1,4 content in the conjugated diene compound portion tends to give wear resistance and resistance to wet skid to a tire as compared with another aromatic vinyl compound-conjugated diene compound copolymer having a greater amount of another microstructure.

It is, therefore, an object of the invention to solve the aforementioned problems of the conventional technique and to provide an aromatic vinyl compound-conjugated diene compound copolymer capable of giving excellent wear resistance and resistance to wet skid to a tire and a method of producing the aromatic vinyl compound-conjugate diene compound copolymer. Also, it is another object of the invention to a rubber composition using the aromatic vinyl compound-conjugated diene compound copolymer as a rubber component and a tire using the rubber composition.

The inventors have made various studies in order to achieve the above objects and found that an aromatic vinyl compound-conjugated diene compound copolymer having not less than 80% of cis-1,4 content in a conjugated diene compound portion is obtained by an addition polymerization of an aromatic vinyl compound and a conjugated diene compound in the presence of a polymerization catalyst composition comprising a particular metallocene complex, and wear resistance and resistance to wet skid can be largely improved by applying a rubber composition using the aromatic vinyl compound-conjugated diene compound copolymer as a rubber ingredient to a tire.

That is, the first aromatic vinyl compound-conjugated diene compound copolymer according to the invention is obtained by an addition polymerization of an aromatic vinyl compound and a conjugated diene compound in the presence of a polymerization catalyst composition comprising at least one complex selected from the group consisting of a metallocene complex represented by the following general formula (I):

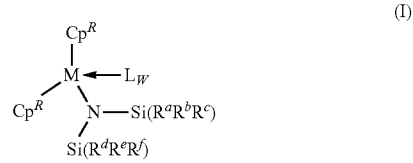

(wherein M is a lanthanoid element, scandium or yttrium, and $Cp^R$ is independently a non-substituted or substituted indenyl, and $R^a$ to $R^f$ are independently an alkyl group having a carbon number of 1-3 or a hydrogen atom, and L is a neutral Lewis base, and w is an integer of 0-3), a metallocene complex represented by the following general formula (II):

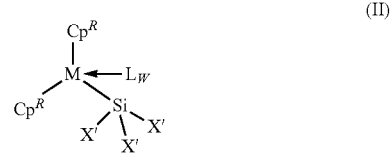

(wherein M is a lanthanoid element, scandium or yttrium, and $Cp^R$ is independently a non-substituted or substituted indenyl, and X' is a hydrogen atom, a halogen atom, an alkoxide group, a thiolate group, an amide group, a silyl group or a hydrocarbon group having a carbon number of 1-20, and L is a neutral Lewis base, and w is an integer of 0-3) and a half metallocene complex represented by the following general formula (III):

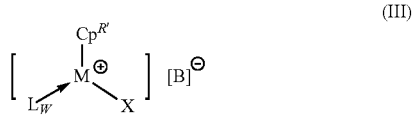

(wherein M is a lanthanoid element, scandium or yttrium, and $Cp^{R'}$ is a non-substituted or substituted cyclopentadienyl, indenyl or fluorenyl, and X is a hydrogen atom, a halogen atom, an alkoxide group, a thiolate group, an amide group, a silyl group or a hydrocarbon group having a carbon number of 1-20, and L is a neutral Lewis base, and w is an integer of 0-3, and [B]⁻ is a non-coordinate anion), wherein a content of cis-1,4 bond in a conjugated diene compound portion is not less than 80%.

Here, the metallocene complex is a complex compound wherein one or two or more of cyclopentadienyl or derivatives thereof are bonded to a center metal, and particularly a metallocene complex having one cyclopentadienyl or a derivative thereof bonded to a center metal may be called as a half metallocene complex.

In the first aromatic vinyl compound-conjugated diene compound copolymer according to the invention, a content of vinyl bond in the conjugated diene compound portion is preferable to be not more than 10%.

In the first aromatic vinyl compound-conjugated diene compound copolymer according to the invention, a block quantity of repetitive units in an aromatic vinyl compound portion as measured by NMR is preferable to be not more than 10% of a full aromatic vinyl compound portion.

The first aromatic vinyl compound-conjugated diene compound copolymer according to the invention is preferable to have a melting point (Tm) as measured by DSC.

In a preferable embodiment of the invention, the first aromatic vinyl compound-conjugated diene compound copolymer is a styrene-butadiene copolymer.

Also, the method of producing the aromatic vinyl compound-conjugated diene compound copolymer according to the invention is characterized by comprising a step of addition-polymerizing an aromatic vinyl compound and a conjugated diene compound in the presence of a polymerization catalyst composition comprising at least one complex selected from the group of consisting of metallocene complexes represented by the above general formulae (I) and (II) and a half metallocene complex represented by the above general formula (III).

Further, the second aromatic vinyl compound-conjugated diene compound copolymer according to the invention is an aromatic vinyl compound-conjugated diene compound copolymer obtained by polymerizing an aromatic vinyl compound and a conjugated diene compound, characterized in that a content of cis-1,4 bond in a conjugated diene compound portion is not less than 80%, and a content of vinyl bond in a conjugated diene compound portion is not more than 5%, and a block quantity of repetitive units in an aromatic vinyl compound portion as measured by NMR is not more than 13% of a full aromatic vinyl compound portion, and a number average molecular weight converted to polystyrene as measured by a gel permeation chromatography is not less than 80,000.

Moreover, the rubber composition according to the invention is characterized by using the aforementioned aromatic vinyl compound-conjugated diene compound copolymer as a rubber component, and the tire according to the invention is characterized by using the rubber composition in a tire member, particularly a tread.

According to the invention, there can be provided an aromatic vinyl compound-conjugated diene compound copolymer in which a microstructure of a conjugated diene compound portion has a content of cis-1,4 bond of not less than 80% and wear resistance and resistance to wet skid can be given to a tire by an addition polymerization of an aromatic vinyl compound and a conjugated diene compound in the presence of a polymerization catalyst composition comprising a particular metallocene complex, and a method of producing the aromatic vinyl compound-conjugated diene compound copolymer. Also, there can be provided a rubber composition and a tire having excellent wear resistance and resistance to wet skid by using the aromatic vinyl compound-conjugated diene compound copolymer.

EMBODIMENTS FOR CARRYING OUT THE INVENTION

The invention will be described in detail below. The aromatic vinyl compound-conjugated diene compound copolymer according to the invention is obtained by an addition polymerization of an aromatic vinyl compound and a conjugated diene compound in the presence of a polymerization catalyst composition comprising at least one complex selected from the group consisting of metallocene complexes represented by the general formulae (I) and (II) and a half metallocene complex represented by the general formula (III), wherein a content of cis-1,4 bond in a conjugated diene compound portion is not less than 80%.

The aromatic vinyl compound-conjugated diene compound copolymer according to the invention is very high in the content of cis-1,4 bond in the conjugated diene compound portion, so that the rubber composition using such an aromatic vinyl compound-conjugated diene compound copolymer as a rubber component can improve the wear resistance while highly maintaining the resistance to wet skid as compared with a rubber composition using a conventional aromatic vinyl compound-conjugated diene compound copolymer obtained by an anion polymerization and a rubber composition using a blend of the conventional aromatic vinyl compound-conjugated diene compound copolymer and a conjugated diene compound homopolymer having a high content of cis-1,4 bond. Although this reason is not necessarily clear, it is considered due to the fact that the effect of improving the wear resistance results in the crystallinity derived from the content of cis-1,4 bond in the conjugated diene compound portion. At this moment, the content of cis-1,4 bond in the conjugated diene compound portion is necessary to be not less than 80%, and is preferably not less than 90%. When the content of cis-1,4 bond in the conjugated diene compound portion is less than 80%, cis chain is not sufficient, and a melting point (Tm) is not measured and the wear resistance lowers. Moreover, the content of cis-1,4 bond in the conjugated diene compound portion can be determined from integral ratio of $^1$H-NMR spectrum and $^{13}$C-NMR spectrum, a concrete way of which is disclosed in JP-A-2004-27179.

Also, in the aromatic vinyl compound-conjugated diene compound copolymer according to the invention, the content of vinyl bond in the conjugated diene compound portion is preferably not more than 10%, more preferably not more than 5%. When the content of vinyl bond in the conjugated diene compound portion is more than 10%, the content of cis-1,4 bond lowers, and the effect of improving the wear resistance is not obtained sufficiently.

The aromatic vinyl compound-conjugated diene compound copolymer can be obtained by a method not particularly limited except for the use of a polymerization catalyst composition as described in detail later, for example, by copolymerizing a mixture of an aromatic vinyl compound and a conjugated diene compound as a monomer likewise a method of producing an addition polymer with the conventional coordination ion polymerization catalyst. Moreover, as the polymerization method may be used any methods such as a solution polymerization method, a suspension polymerization method, a liquid-phase bulk polymerization method, an emulsion polymerization method, a vapor-phase polymerization method, a solid-phase polymerization method and the like. If a solvent is used in the polymerization reaction, the solvent used may be inactive to the polymerization reaction, wherein the amount of the solvent used is optional but is preferable to be such an amount that a concentration of the complex included in the polymerization catalyst composition is 0.1-0.0001 mol/l. As the aromatic vinyl compound are mentioned styrene, p-methylstyrene, m-methylstyrene, p-tert-butylstyrene, α-methylstyrene, chloromethylstyrene, vinyl toluene and so on. Among them, styrene is preferable. As the conjugated diene compound are mentioned 1,3-butadiene, isoprene, 1,3-pentadiene, 2,3-dimethylbutadiene and so on. Among them, 1,3-butadiene is preferable. Therefore, as the aromatic vinyl compound-conjugated diene compound copolymer according to the invention is particularly preferable styrene-butadiene copolymer.

The polymerization catalyst composition used in the synthesis of the aromatic vinyl compound-conjugated diene compound copolymer according to the invention is required to comprise at least one complex selected from the group consisting of the metallocene complexes represented by the general formulae (I) and (II) and the half metallocene complex represented by the general formula (III), and is preferable to further include another component included in the polymerization catalyst composition including the usual metallocene complex such as co-catalyst or the like.

In the metallocene complexes represented by the general formulae (I) and (II), $Cp^R$ is a non-substituted or substituted indenyl. $Cp^R$ having n indenyl ring as a basic skeleton may be represented by $C_9H_{7-x}R_x$ or $C_9H_{11-x}R_x$, wherein X is an integer of 0-7 or 0-11. Also, R is preferable to be independently hydrocarbyl group or metalloid group. The carbon number of the hydrocarbyl group is preferably 1-20, more preferably 1-10, most preferably 1-8. As a concrete example of the hydrocarbyl group are preferably mentioned methyl group, ethyl group, phenyl group, benzyl group and so on. As an example of a metalloid in the metalloid group are mentioned gelmill Ge, stannyl Sn and silyl Si. The metalloid group is preferable to have a hydrocarbyl group, in which the hydrocarbyl group included in the metalloid group is the same as the aforementioned hydrocarbyl group. As the metalloid group are concretely mentioned trimethysilyl group and the like, and as the substituted indenyl are concretely mentioned 2-phenylindenyl, 2-methylindenyl and the like. Moreover, two $Cp^R$s in the general formulae (I) and (II) may be same or different.

In the half metallocene complex represented by the general formula (III), $Cp^{R'}$ is a non-substituted or substituted cyclopenrtadienyl, indenyl or fluorenyl, and among them the non-substituted or substituted indenyl is preferable. $Cp^{R'}$ having a cyclopentadienyl ring as a basic skeleton is represented by $C_5H_{5-x}R_x$, wherein X is an integer of 0-5. Also, R is preferable to be independently a hydrocarbyl group or a metalloid group, in which the carbon number of hydrocarbyl group is preferably 1-20, more preferably 1-10, most preferably 1-8. As the hydrocarbyl group are preferably mentioned methyl group, ethyl group, phenyl group, benzyl group and so on. As an example of a metalloind in the metalloid group are mentioned gelmill Ge, stannyl Sn and silyl Si. The metalloid group is also preferable to have a hydrocarbyl group, in which the hydrocarbyl group included in the metalloid group is the same as the aforementioned hydrocarbyl group. As the metalloid group are concretely mentioned trimethysilyl group and the like. As $Cp^{R'}$ having a cyclopentadienyl ring as a basic skeleton are concretely exemplified the followings:

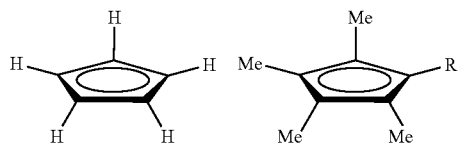

(wherein R is a hydrogen atom, methyl group or ethyl group).

In the general formula (III), $Cp^{R'}$ having the indenyl ring as a basic skeleton is defined in the same manner as $Cp^R$ of the general formula (I), and a preferable example thereof is same as mentioned above.

In the general formula (III), $Cp^{R'}$ having a fluorenyl ring as a basic skeleton may be represented by $C_{13}H_{9-x}R_x$ or $C_{13}H_{17-x}R_x$, wherein X is an integer of 0-9 or 0-17. Also, R is preferable to be independently hydrocarbyl group or metalloid group. The carbon number of the hydrocarbyl group is preferably 1-20, more preferably 1-10, most preferably 1-8. As a concrete example of the hydrocarbyl group are preferably mentioned methyl group, ethyl group, phenyl group, benzyl group and so on. As an example of a metalloid in the metalloid group are mentioned gelmill Ge, stannyl Sn and silyl Si. The metalloid group is preferable to have a hydrocarbyl group, in which the hydrocarbyl group included in the metalloid group is the same as the aforementioned hydrocarbyl group. As the metalloid group are concretely mentioned trimethysilyl group and the like.

The center metal M in the general formulae (I), (II) and (III) is a lanthanoid element, scandium or yttrium. In the lanthanoid element are included fifteen elements of Atomic Numbers 57-71, and any one of them may be used. As the center metal M are preferably mentioned samarium Sm, neodymium Nd, praseodymium Pr, gadolinium Gd, cerium Ce, holmium Ho, scandium Sc and yttrium Y.

The metallocene complex represented by the general formula (I) comprises a bistrialkylsilylamide ligand [—N(SiR₃)₂]. The alkyl group R included in bistrialkylsilylamide ($R^a$-$R^f$ in the general formula (I)) are independently an alkyl group having a carbon number of 1-3, and is preferable to be methyl group. Moreover, $R^a$-$R^f$ may be a hydrogen atom in addition to the alkyl group.

The metallocene complex represented by the general formula (II) comprises a silyl ligand [—SiX'₃]. X' included in the silyl ligand [—SiX'₃] is a group defined in the same manner as in X of the general formula (III) described later, and a preferable group is same as mentioned later.

In the general formula (III), X is a group selected from the group consisting of a hydrogen atom, a halogen atom, an alkoxide group, a thiolate group, an amide group, a silyl group and a hydrocarbon group having a carbon number of 1-20. As the alkoxide group are mentioned aliphatic alkoxy groups such as methoxy group, ethoxy group, propoxy group, n-butoxy group, isobutoxy group, sec-butoxy group, tert-butoxy group and the like; and aryloxide groups such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group, 2-isopropyl-6-neopentylphenoxy group and the like. Among them, 2,6-di-tert-butylphenoxy group is preferable.

As the thiolate group represented by X in the general formula (III) are mentioned aliphatic thiolate groups such as thiomethoxy group, thioethoxy group, thiopropoxy group, thio-n-butoxy group, thioisobutoxy group, thio-sec-butoxy group, thio-tert-butoxy group and the like; and arylthiolate groups such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-neopentylthiophenoxy group, 2-isopropyl-6-neopentylthiophenoxy group, 2,4,6-triisopropylthiophenoxy group and the like. Among them, 2,4,6-triisopropylthiophenoxy group is preferable.

As the amide group represented by X in the general formula (III) are mentioned aliphatic amide groups such as dimethylamide group, diethylamide group, diisopropylamide group and the like; arylamide groups such as phenylamide group, 2,6-di-tert-butylphenylamide group, 2,6-diisopropylphenylamide group, 2,6-dineopentylphenylamide group, 2-tert-butyl-6-isopropylphenylamide group, 2-tert-butyl-6-neopentylphenylamide group, 2-isopropyl-6-neopentylphenylamide group, 2,4,6-tert-butylphenylamide group and the like; and bistrialkylsilylamide groups such as bistrimethylsilylamide and the like. Among them, bistrimethylsilylamide is preferable.

As the silyl group represented by X in the general formula (III) are mentioned trimethylsilyl group, tris(trimethylsilyl)silyl group, bis(trimethylsilyl)methylsilyl group, trimethylsilyl(dimethyl)silyl group, triisopropylsilyl(bistrimethylsilyl)silyl group and the like. Among them, tris(trimethylsilyl)silyl group is preferable.

As the halogen atom represented by X in the general formula (III) may be any one of fluorine atom, chlorine atom, bromine atom and iodine atom, but chlorine atom or bromine atom is preferable. As the hydrocarbon group having a carbon number of 1-20 represented by X are concretely mentioned straight or branched chain aliphatic hydrocarbon groups such as methyl group, ethyl group, n-propyl group, isopropyl group, n-butyl group, isobutyl group, sec-butyl group, tert-butyl group, neopentyl group, hexyl group, octyl group and the like; aromatic hydrocarbon groups such as phenyl group, tolyl group, naphthyl group and the like; and silicon atom-containing hydrocarbon groups such as bistrimethylsilylmethyl group and the like. Among them, methyl group, ethyl group, isobutyl group and trimethylsilylmethyl group are preferable.

As X in the general formula (III) is preferable bistrimethylsilylamide group or a hydricarbon group having a carbon number of 1-20.

The non-coordinate anion represented by [B]⁻ in the general formula (III) includes, for example, a tetravalent boron anion. As the tetravalent boron anion are concretely mentioned tetraphenyl borate, tetrakis(monofluorophenyl)borate, tetrakis(difluorophenyl)borate, tetrakis(trifluorophenyl)borate, tetrakis(tetrafluorophenyl)borate, tetrakis'pentafluorophenyl)borate, tetrakis(tetrafluoromethylphenyl)borate, tetra(tolyl)borate, tetra(xylyl)borate, (triphenyl, pentafluorophenyl)borate, [tri(pentafluorophenyl), phenyl]borate, tridecahydride-7,8-dicarbaundecaborate and the like. Among them, tetrakis(pentafluorophenyl)borate is preferable.

The metallocene complexes represented by the general formulae (I) and (II) and the half metallocene complex represented by the general formula (III) comprise further 0-3, preferably 0-1 neutral Lewis base L. respectively. As the neutral Lewis base L are mentioned, for example, tetrahydrofuran, diethyl ether, dimethylaniline, trimethylphosphine, lithium chloride, neutral olefins, neutral diolefins and so on. If plural neutral Lewis bases L are included in the above complex, these neutral Lewis bases may be same or different.

Also, each of the metallocene complexes of the general formulae (I) and (II) and the half metallocene complex of the general formula (III) may be existent as a monomer or may be existent as a dimer or more multipler.

The metallocene complex represented by the general formula (I) can be obtained, for example, by reacting lanthanoid trishalide, scandium trishalide or yttrium trishalide with an indenyl salt (e.g. potassium salt or lithium salt) or a salt of bis(trialkylsilyl)amide (e.g. potassium salt or lithium salt) in a solvent. Moreover, the reaction temperature is sufficient to be about room temperature, so that the production may be carried out under a moderate condition. Also, the reaction time is optional, but is several hours to about several ten hours. The reaction solvent is not particularly limited, but is preferable to be a solvent dissolving a starting material and a product. For example, toluene may be used. An example of the reaction for the production of the metallocene complex of the general formula (I) is shown below:

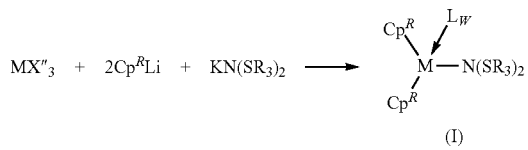

(wherein X" is a halide).

The metallocene complex represented by the general formula (II) can be obtained, for example, by reacting lanthanoid trishalide, scandium trishalide or yttrium trishalide with an indenyl salt (e.g. potassium salt or lithium salt) or a salt of bis(trialkylsilyl)amide (e.g. potassium salt or lithium salt) in a solvent. Moreover, the reaction temperature is sufficient to be about room temperature, so that the production may be carried out under a moderate condition. Also, the reaction time is optional, but is several hours to about several ten hours. The reaction solvent is not particularly limited, but is preferable to be a solvent dissolving a starting material and a product. For example, toluene may be used. An example of the reaction for the production of the metallocene complex of the general formula (II) is shown below:

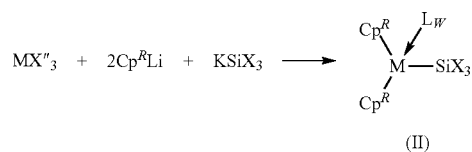

(wherein X" is a halide).

The half metallocene complex represented by the general formula (III) can be obtained, for example, by the following reaction.

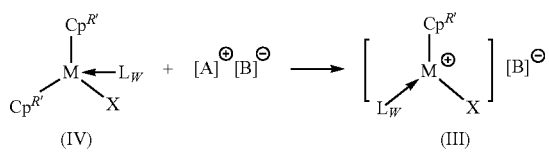

In the compound represented by the general formula (IV), M is a lanthanoid element, scandium or yttrium, and $Cp^{R'}$ is independently a non-substituted or substituted cyclopentadienyl, indenyl or fluorenyl, and X is a hydrogen atom, a halogen atom, an alkoxide, group, a thiolate group, an amide group, a silyl group or a hydrocarbon group having a carbon number of 1-20, and L is a neutral Lewis base, and w is an integer of 0-3. In the ionic compound represented by the general formula $[A]^+[B]^-$, $[A]^+$ is a cation and $[B]^-$ is a non-coordinate anion.

As the cation represented by $[A]^+$ are mentioned carbonium cation, oxonium cation, amine cation, phosphonium cation, cycloheptatrienyl cation, ferrocenium cation having a transition metal and so on. As the carbonium cation is mentioned a tri-substituted carbonium cation such as tri(substituted phenyl)carbonium cation or the like, and as the tri(substituted phenyl)carbonium cation is concretely mentioned tri(methylphenyl)carbonium cation or the like. As the amine cation are mentioned trialkylammonium cations such as trimethylammonium cation, triethylammonium cation, tripropylammonium cation, tributylammonium cation and the like; N,N-dialkylanilinium cations such as N,N-dimethylanilinium cation, N,N-diethylanilinium cation, N,N-2,4,6-pentamethylanilinium cation and the like; and dialkylammonium cations such as diisopropylammonium cation, dicyclohexylammonium cation and the like. As the phosphonium cation are mentioned triarylphosphonium cations such as triphenylphosphonium cation, tri(methylphenyl)phosphonium cation, tri(dimethylphenyl)phosphonium cation and the like. Among these cations, N,N-dialkylanilinium cation and carbonium cation are preferable, and N,N-dialklylanilinium cation is particularly preferable.

The ionic compound represented by the general formula $[A]^+[B]^-$ used in the above reaction is a compound of a combination selected from the aforementioned non-coordinate anoins and carions, respectively, and N,N-dimethylanilinium tetrakis(pentafluorophenyl)borate, triphenylcarbonium tetrakis(pentafluorophenyl)borate and so on are preferable. Also, the ionic compound represented by the general formula $[A]^+[B]^-$ is added to the metallocene complex in an amount of preferably 0.1-10 times mol, more preferably about 1 times mol. Moreover, when the half metallocene complex of the general formula (III) is used in the polymerization reaction, the half metallocene complex of the general formula (III) may be charged into a polymerization reaction system as it is, or the compound of the general formula (IV) and the ionic compound of the general formula $[A]^+[B]^-$ may be separately charged into the polymerization reaction system to form the half metallocene complex of the general formula (III) in the reaction system. Alternatively, the half metallocene complex of the general formula (III) may be formed in the reaction system by combining and using the metallocene complex of the general formula (I) or (II) with the ionic compound of the general formula $[A]^+[B]^-$.

The structures of the metallocene complexes represented by the general formulae (I) and (II) and the half metallocene complex represented by the general formula (III) are preferable to be determined by an X-ray structural analysis, respectively.

A cocatalyst usable in the above polymerization catalyst composition may be optionally selected from components used as a cocatalyst in a polymerization catalyst composition containing the conventional metallocene complex. As the cocatalyst are preferably mentioned, for example, aluminoxane, organoaluminum compounds, the above ionic compounds and the like. These cocatalysts may be used alone or in a combination of two or more.

As the aluminoxane is preferable an alkylaluminoxane, which includes, for example, methyl aluminoxane (MAO), a modified methyl aluminoxane and the like. As the modified methyl aluminoxane is preferable MMAO-3A (made by Toso Finechem Co., Ltd.) or the like. Moreover, the amount of aluminoxane in the polymerization catalyst composition is preferable to be made so that an elementary ratio Al/M of aluminum element Al in the aluminoxane to the center metal M of the metallocene complex is about 10-1000, preferably about 100.

As the organoaluminum compound are mentioned, for example, trialkylaluminum, dialkylaluminum chloride, alkylaluminum dichloride, dialkylaluminum hydride and the like. Among them, trialkylaluminum is preferable. As the trialkylaluminum are mentioned, for example, triethylaluminum, triisobutylaluminum and the like. Moreover, the amount of the organoaluminum compound in the polymerization catalyst composition is preferably 1-50 times mol, more preferably about 10 times mol per the metallocene complex.

Further, the content of cis-1,4 bond and the molecular weight of the resulting copolymer can be increased by properly combining the metallocene complexes of the general formulae (I) and (II) and the half metallocene complex of the general formula (III) with a suitable cocatalyst, respectively.

The method of producing the aromatic vinyl compound-conjugated diene compound copolymer according to the invention is characterized by comprising a step of addition-polymerizing an aromatic vinyl compound and a conjugated diene compound in the presence of a polymerization catalyst composition comprising at least one complex selected from the group consisting of the metallocene complexes of the general formulae (I) and (II) and the half metallocene complex of the general formula (III). Moreover, the production method of the invention may be the same as a method of producing an addition polymer through an addition polymerization reaction using the conventional coordinate ion polymerization catalyst except that the aforementioned polymerization catalyst composition is used as a polymerization catalyst. In the production method of the invention, for example, (1) components of the polymerization catalyst composition may be separately added to a polymerization reaction system containing an aromatic vinyl compound and a conjugated diene compound as a monomer to form the polymerization catalyst composition in the reaction system, or (2) the previously prepared polymerization catalyst composition may be added to the polymerization reaction system. Also, the step (2) may include the addition of a metallocene complex activated with a cocatalyst (active species). Moreover, the amount of the metallocene complex used in the polymerization catalyst composition is preferable to be within a range of $1/10000$-$1/100$ times mol per the monomer.

Also, the number average molecular weight of the resulting copolymer according to the invention is not particularly limited but also does not cause the problem of low molecular weight formation. Moreover, the aromatic vinyl compound-conjugated diene compound copolymer according to the invention is preferable to have a number average molecular weight converted to polystyrene of not less than 80,000 as measured by a gel permeation chromatography. Furthermore, a molecular weight distribution (Mw/Mn) represented by a ratio of weight average molecular weight (Mw) to number average molecular weight (Mn) is preferably not more than 3, more preferably not more than 2. At this moment, the average molecular weight and molecular weight distribution can be measured with polystyrene as a standard substance through a gel permeation chromatography (GPC).

The addition polymerization reaction is preferable to be carried out in an atmosphere of an inert gas, preferably nitrogen gas or argon gas.

The polymerization temperature of the addition polymerization reaction is not particularly limited, but is preferably within a range of, for example, $-100°$ C. to $20°$ C. and may be about room temperature. If the polymerization temperature is raised, cis-1,4 selectivity in the polymerization reaction may lower. On the other hand, the reaction time of the addition polymerization reaction is not particularly limited and is preferably within a range of, for example, 1 second to 10 days, but it may be properly selected in accordance with conditions of kind of monomers to be polymerized, kind of catalyst, polymerization temperature and so on.

In the aromatic vinyl compound-conjugated diene compound copolymer according to the invention, the block quantity of repetitive units in the aromatic vinyl compound portion as measured by NMR is preferably not more than 13% of the full aromatic vinyl compound portion, more preferably not more than 10%, further preferably not more than 7%, and particularly preferably 0%. In the copolymer of the invention obtained by using the aforementioned polymerization catalyst composition, the aromatic vinyl compound tends to be polymerized randomly, so that the blocking of the aromatic vinyl compound can be suppressed. The term "random" used herein means that the block quantity of repetitive units in the aromatic vinyl compound portion as measured by NMR (which may also be referred to blocked aromatic vinyl compound content hereinafter) is not more than 10% of the full aromatic vinyl compound portion, and the term "block" means an aromatic vinyl compound portion having an aromatic vinyl compound-aromatic vinyl compound bond. When the blocked aromatic vinyl compound content exceeds 13%, the behavior as a homopolymer of aromatic vinyl compound is visible, and the glass transition temperature may be raised and the wear resistance may be deteriorated. Moreover, the blocked aromatic vinyl compound content can be measured from an integral ratio of $^1$H-NMR spectrum.

Further, the aromatic vinyl compound-conjugated diene compound copolymer according to the invention indicates a melting point (Tm) as measured by DSC (differential scanning calorimetry). In this case, the melting point (Tm) by DSC measurement indicates a melting point of a static crystal derived from a chain of the conjugated diene compound portion.

The rubber composition according to the invention is characterized by using the aforementioned aromatic vinyl compound-conjugated diene compound copolymer as a rubber component, and is preferable to further contain a filler. The amount of the filler compounded is not particularly limited, but is preferable to be a range of 10-200 parts by mass per 100 parts by mass of the aromatic vinyl compound-conjugated diene compound copolymer. When the amount of the filler compounded is less than 10 parts by mass, the sufficient reinforcing effect may be not obtained, while when it exceeds 200 parts by mass, the processability may be deteriorated. As the filler are preferable carbon black and silica. As the carbon black, GPF, FEF, SRF, HAF, ISAF and SAF grades are preferable, and HAF, ISAF and SAF grades are more preferable. As the silica, wet silica, dry silica and the like are preferable, and wet silica is more preferable. These reinforcing fillers may be used alone or in a combination of two or more.

In addition to the aromatic vinyl compound-conjugated diene compound copolymer and the filler, the rubber composition according to the invention may be compounded with additives usually used in the rubber industry such as antioxidant, softening agent, silane coupling agent, vulcanization accelerator, accelerator promoter, vulcanizing agent and so on, which are properly selected within a range not damaging the object of the invention. As the additives, commercially available ones may be used preferably. The rubber composition according to the invention can be produced by compounding the aromatic vinyl compound-conjugated diene compound copolymer with various additives properly selected if necessary and then milling, warming and extruding them.

The tire according to the invention is characterized by using the above rubber composition. It is preferable to use the rubber composition in a tread. The tire using the rubber composition in the tread is excellent in the wear resistance and resistance to wet skid. Moreover, the tire according to the invention is not particularly limited except that the above rubber composition is used in any one of tire members, and can be manufactured according to the usual manner. As a gas to be filled in the tire can be used normal air or air having a regulated oxygen partial pressure but also an inert gas such as nitrogen, argon, helium or the like.

EXAMPLES

The following examples are given in illustration of the invention and are not intended as limitations thereof.

At first, a half metallocene complex represented by the general formula (III) commonly used in Examples 1 and 2 is synthesized and a structure thereof is confirmed by $^1$H-NMR and X-ray crystal structure analysis. Moreover, the measurement of $^1$H-NMR is carried out with THF-d8 as a solvent at room temperature. The X-ray crystal structure analysis is carried out with RAXISCS (made by Rigaku Co., Ltd.).

Synthesis Example of [(2-MeC$_9$H$_6$)GdN(SiMe$_3$)$_2$(THF)$_3$][B(C$_6$F$_5$)$_4$]

To 5 mL of a solution of (2-MeC$_9$H$_6$)$_2$GdN(SiMe$_3$)$_2$ (0.150 g, 0.260 mmol) in THF is added triethylanilinium tetrakisphenyl borate (Et$_3$NHB(C$_6$H$_6$)$_4$) (0.110 g, 0.260 mmol) in a nitrogen atmosphere, which are stirred at room temperature for 12 hours. Subsequently, THF is removed under a reduced pressure, and the resulting residue is washed with hexane three times to obtain an oily compound. The residue is recrystallized with a THF/hexane mixed solvent to obtain [(2-MeC$_9$H$_6$)GdN(SiMe$_3$)$_2$(THF)$_3$][B(C$_6$F$_5$)$_4$] (150 mg, 59%) as a white crystal. The confirmation of the structure is conducted by an X-ray crystal analysis.

Synthesis Example of Gd(N(SiHMe$_2$)$_2$)$_3$(THF)$_2$

To 100 mL of a solution of GdCl$_3$ made by Strem Chemicals Inc. (2.90 g, 11 mmol) in THF is added 15 mL of LiN(SiHMe$_2$)$_2$ synthesized from n-BuLi and NH(SiHMe$_2$)$_2$ (4.18 g, 30 mmol) in ether dropwise in a nitrogen atmosphere, which are stirred at room temperature for 12 hours. Subsequently, the solvent is removed under a reduced pressure and 100 mL of hexane is added and precipitates are filtered off. Then, hexane is slowly removed from the filtrate under a reduced pressure to obtain a white crystal of Gd(N(SiHMe$_2$)$_2$)$_3$(THF)$_2$ (4.60 g, 66%). The structure determination is carried out by X-ray crystal structure analysis of the resulting single crystal. Moreover, the analytical result is shown below.

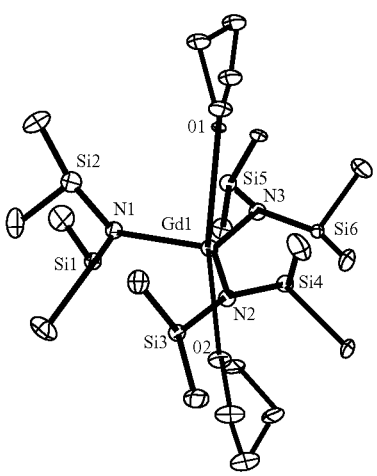

Synthesis Example of (2-PhC$_9$H$_6$)$_2$GdN(SiHMe$_2$)$_2$

Under a nitrogen atmosphere Gd(N(SiHMe$_2$)$_2$)$_3$(THF) (2.79 g, 4 mmol) and 2-PhC$_9$H$_7$ (2-phenylindene) sold by Aldrich (1.50 g, 7.8 mmol) are dissolved in 60 ml of toluene and stirred at 120° C. for 4 hours. Subsequently, toluene is removed under a reduced pressure, and 60 mL of toluene is again added and stirred at 120° C. for 15 hours. Then, toluene is removed under a reduced pressure, and the resulting residue is washed with hexane several times to obtain a yellow solid of (2-PhC$_9$H$_6$)$_2$GdN(SiHMe$_2$)$_2$ (1.92 g, 73%).

Synthesis Example of (2-PhC$_9$H$_6$)$_2$TbN(SiHMe$_2$)$_2$

Tb(N(SiHMe$_2$)$_2$)$_3$(THF)$_2$ is obtained in the same manner as the synthesis example of (2-PhC$_9$H$_6$)$_2$GdN(SiHMe$_2$)$_2$ except that TbCl$_3$ is used instead of GdCl$_3$. Then, (2-PhC$_9$H$_6$)$_2$TbN(SiHMe$_2$)$_2$ (1.85 g, 70%) is obtained in the same manner as the synthesis example of (2-PhC$_9$H$_6$)$_2$GdN(SiHMe$_2$)$_2$ except that Tb(N(SiHMe$_2$)$_2$)$_3$(THF)$_2$ is used instead of Gd(N(SiHMe$_2$)$_2$)$_3$(THF)$_2$.

Example 1

Into a pressure glass bottle of 1 L sufficiently dried in a glove box under a nitrogen atmosphere are charged 104 g (1 mol) of styrene and 50 g of toluene and then the bottle is plugged. Subsequently, the bottle is taken out from the glove box and 54 g (1 mol) of 1,3-butadiene is charged thereinto to form as monomer solution. Separately, into a glass vessel in a glove box under a nitrogen atmosphere are charged 40 μmol of bis(2-methylindenyl)gadolinium(trimethylsilylamide) [(2-MeC$_9$H$_6$)$_2$GdN(SiMe$_3$)$_2$], 40 μmol of triphenylcarbonium tetrakis(pentafluorophenyl)borate (Ph$_3$CB(C$_6$F$_5$)$_4$) and 1 mmol of diisobutylaluminum halide, which are dissolved in 10 ml of toluene to form a catalyst solution. Thereafter, the catalyst solution is taken out from the glove box and added to the monomer solution to conduct polymerization at 70° C. for 30 minutes. After the polymerization, 10 ml of a 10 mass % solution of 2,6-bis(t-butyl)-4-methyl phenol (BHT) in methanol is added to stop the reaction. Then, the resulting polymer is separated with a great amount of methanol/hydrochloric acid mixed solvent and dried at 60° C. under vacuum. The yield of the polymer is 47 g.

Example 2

The polymerization is carried out in the same manner as in Example 1 except that the amount of diisobutylaluminum halide used in the catalyst solution is 0.8 mmol. The yield of the resulting polymer is 46 g.

Comparative Example 4

Into a pressure glass bottle of 30 ml sufficiently dried in a glove box under a nitrogen atmosphere is charged 0.03 mmol of dimethylaluminum(μ-dimethyl)bis(pentamethylcyclopentadienyl)samarium [(Cp*)$_2$Sm(μ-Me)$_2$AlMe$_2$] (Cp*: pentamethylcyclopentadienyl ligand), which is dissolved in 1 ml of toluene. Then, 0.09 mmol of triisobutylaluminum and 0.03 mmol of triphenylcarbonium tetrakis(pentafluorophenyl)borate (Ph$_3$CB(C$_6$F$_5$)$_4$) are added and then the bottle is plugged. Subsequently, the bottle is taken out from the glove box and 0.49 g of 1,3-butadiene and 2.4 ml of styrene are added to conduct polymerization at 50° C. for 12 hours. After the polymerization, 10 ml of a 10 wt % solution of 2,6-bis(t-butyl)-4-methyl phenol (BHT) in methanol is added to stop the reaction. The resulting polymer is separated with a greater amount of methanol/hydrochloric acid mixed solvent and dried at 60° C. under vacuum. The yield of the polymer is 20 wt %.

Comparative Example 5

A polymer is obtained in the same manner as in Comparative Example 4 except that 0.65 g of 1,3-butadiene and 2.0 ml of styrene are charged to conduct polymerization at 50° C. for 6 hours. The yield of the resulting polymer is 20 wt %.

Comparative Example 6

Into an autoclave of 1.5 L capacity provided with a stirrer and purged with nitrogen are charged 300 ml of toluene as a solvent, 2.1 mmol of cyclopentadienyltitanium chloride (Cp-TiCl$_3$), 210 mmol of methylaluminoxane (MAO) and 2.1 mmol of chloranil (CpTiCl$_3$/chloranil=1/1 (molar ratio)), and then 37.5 ml of 1,3-butadiene and 37.5 ml of styrene are added to conduct polymerization at 60° C. for 30 minutes. After 10 minutes of polymerization start, a solution of a small amount of p-t-butylcatechol as an polymerization inhibitor dissolved in methanol is added to stop the polymerization reaction. A polymer is obtained by removing toluene from the solution.

With respect to polymers of Examples 1-2 and Comparative Examples 1-6 produced as mentioned above, the number average molecular weight (Mn), molecular weight distribution (Mw/Mn), microstructure, bound stryene content, blocked styrene content, glass transition point (Tg) and melting point (Tm) are measured by the following methods. The results are shown in Table 1.

(1) Number Average Molecular Weight (Mn) and Molecular Weight Distribution (Mw/Mn)

The number average molecular weight (Mn) converted to polystyrene and molecular weight distribution (Mw/Mn) of each of the polymers are measured by a gel permeation chromatography [GPC: HLC-8020 made by Toso Co., Ltd. Column: GMH-XL made by Toso Co., Ltd. (two columns in series), detector: differential refractive index meter (RI)] with monodisperse polystyrene as a standard substance.

(2) Microstructure and Bound Styrene Content

The microstructure of the polymer is measured from integral ratio of $^1$H-NMR spectrum and $^{13}$C-NMR spectrum, and the bound styrene content of the polymer is measured from an integral ratio of $^1$H-NMR spectrum. Moreover, the measurements of $^1$H-NMR and $^{13}$C-NMR are carried out at 120° C. with 1,1,2,2-tetrachloroethane as a solvent.

(3) Blocked Styrene Content

A ratio of block quantity of repetitive units in styrene portion as measured by NMR (blocked styrene content) occupied in the full styrene portion is measured from an integer of $^1$H-NMR spectrum.

(4) Glass Transition Point (Tg)(° C.) and Melting Point (Tm)(° C.)

A sample is weighed at 10 mg±0.5 mg and placed in an aluminum measuring pan and sealed with a cover, which is warmed from room temperature to 50° C. in a DSC apparatus (made by TA Instrument) and stabilized for 10 minutes, and thereafter cooled to −80° C. and stabilized at −80° C. for 10 minutes and then raised up to 50° C. at a temperature rising rate of 10° C./min, during which the glass transition point (Tg) and melting point (Tm) are measured.

Moreover, styrene-styrene bond is not particularly confirmed from detailed NMR data of the sample.

TABLE 1

| | Comparative Example | | | | | | Example | |
|---|---|---|---|---|---|---|---|---|
| | 1 *1 | 2 *2 | 3 *3 | 4 | 5 | 6 | 1 | 2 |
| Number average molecular weight (Mn) (×10⁴) | 15.5 | 13.5 | 14.2 | 3.6 | 7.4 | 3.7 | 16.5 | 12.3 |
| Molecular weight distribution (Mw/Mn) | 2.4 | 3 | 2.9 | 1.8 | 1.7 | 2 | 2.1 | 1.9 |
| Bound styrene content (mass %) | 0 | 18 | 25 | 18 | 10 | 19 | 10 | 12 |
| Content of cis-1,4 structure (%) | 37 | 36 | 36 | 91 | 87 | 65 | 93 | 92 |
| Content of vinyl structure (%) | 14 | 13 | 13 | 1.8 | 3.1 | 3.9 | 1.8 | 2.0 |
| Blocked styrene content (%) | — | 8 | 13 | 15 | 14 | 8 | 7 | |
| Glass transition point (Tg) (° C.) | −95 | −78 | −71 | −98 | — | — | −100 | −97 |
| Melting point (Tm) (° C.) | — | — | — | −17 | — | — | −17 | −16 |

*1 Polybutadiene, made by Asahi Chemical Industry Co., Ltd. trade name: NF35
*2 Styrene-butadiene copolymer, made by Asahi Chemical Industry Co., Ltd. trade name: Tafuden 1000
*3 Styrene-butadiene copolmer, made by Asahi Chemical Industry Co., Ltd. trade name: Tafuden 2000

Then, a rubber composition having a compounding recipe shown in Table 2 is prepared by using the polymers of Examples 1-2 and Comparative Examples 1-6, which is vulcanized under usual conditions to obtain a vulcanized rubber. The resistance to wet skid and wear resistance of the vulcanized rubber are measured by the following methods. The results are shown in Table 3.

(5) Resistance to Wet Skid

The resistance to wet skid of the rubber composition is measured on a wet road using BPST (British Portable Skid Resistance Tester) and represented by an index on the basis that Comparative Example 1 is 100. The larger the indexes value, the better the resistance to wet skid.

(6) Wear Resistance

The worn amount is measured at room temperature using a Lambourn abrasion tester, and a reciprocal of the worn amount is calculated and represented by an index on the basis that Comparative Example 1 is 100. The larger the index value, the smaller the worn amount and the better the wear resistance.

TABLE 2

| Milling stage | Compounding substances | part by mass |
|---|---|---|
| First stage | polymer *4 | 100 |
| | carbon black *5 | 50 |
| | stearic acid | 2 |
| | antioxidant 6C *6 | 1 |
| Second stage | zinc oxide | 2.5 |
| | vulcanization accelerator D-G *7 | 0.2 |
| | vulcanization accelerator DM-P *8 | 0.2 |
| | Vulcanization accelerator NS-P *9 | 0.5 |
| | sulfur | 1.3 |

*4 Polymers of Examples 1-2 and Comparative Examples 1-6, kind of polymer used is shown in Table 3
*5 HAF grade, made by Asahi Carbon Co., Ltd.
*6 N-(1,3-dimethylbutyl)-N'-phenyl-p-phenylene diamine
*7 diphenyl guanidine
*8 di-2-benzothiazolyl disulfide
*9 N-t-butyl-2-benzothiazolyl sulfenamide

TABLE 3

Property evaluation of rubber composition

| kind of polymer used | Resistance to wet skid (index) | Wear resistance (index) |
|---|---|---|
| Comparative Example 1 | 100 | 100 |
| Comparative Example 2 | 105 | 94 |
| Comparative Example 3 | 110 | 89 |
| Comparative Example 4 | 104 | 95 |
| Comparative Example 5 | 110 | 93 |
| Comparative Example 6 | 110 | 91 |
| Example 1 | 105 | 104 |
| Example 2 | 107 | 102 |

When the rubber compositions using the polymers of Examples 1-2 having not less than 80% of content of cis-1,4 bond in conjugated diene compound portion as a rubber component are compared with the rubber composition using polybutadiene with a low content of cis-1,4 bond (Comparative Example 1), it can be seen that the resistance to wet skid and wear resistance are good.

Also, when the rubber compositions using the polymers of Examples 1-2 are compared with the use of styrene-butadiene copolymer having a low content of cis-1,4 bond (Comparative Examples 2-3), it can be seen that the wear resistance is largely improved while keeping the resistance to wet skid to same level.

Further, when the rubber compositions using the polymers of Examples 1-2 are compared with the rubber compositions using the polymers synthesized with the conventional metallocene catalyst system (Comparative Examples 4-6), it can be seen that the resistance to wet skid and the wear resistance are balanced highly.

Example 3

Into a pressure glass bottle of 1 L sufficiently dried in a glove box under a nitrogen atmosphere are charged 104 g (1 mol) of styrene and 50 g of toluene, and the bottle is plugged. Subsequently, the bottle is taken out from the glove box and 54 g (1 mol) of 1,3-butadiene is charged thereinto to form a monomer solution. Separately, into a glass vessel in a glove box under a nitrogen atmosphere are charged 100 μmol of bis(2-phenylindenyl)gadolinium(dimethylsilylamide) [(2-PhC$_9$H$_6$)$_2$GdN(SiHMe$_2$)$_2$], 100 μmol of triphenylcarbonium tetrakis(pentafluorophenyl)borate (Ph$_3$CB(C$_6$F$_5$)$_4$) and 900 μmol of diisobutylaluminum halide, which are dissolved in 10 ml of toluene to form a catalyst solution. Then, the catalyst solution is taken out from the glove box and added to the monomer solution to conduct polymerization at 95° C. for 30 minutes. After the polymerization, 10 ml of a 10 wt % solution of 2,6-bis(t-butyl)-4-methyl phenol (BHT) in methanol is added to stop the reaction. The resulting polymer is separated with a greater amount of methanol/hydrochloric acid mixed solvent and dried at 60° C. under vacuum. The yield of the resulting polymer is 54 g.

Example 4

Into a pressure glass bottle of 1 L sufficiently dried in a glove box under a nitrogen atmosphere are charged 125 g (1.2 mol) of styrene and 50 g of toluene, and the bottle is plugged. Subsequently, the bottle is taken out from the glove box and 32.4 g (0.6 mol) of 1,3-butadiene is charged thereinto to form a monomer solution. Separately, into a glass vessel in a glove box under a nitrogen atmosphere are charged 60 μmol of bis(2-phenylindenyl)gadolinium(dimethylsilylamide) [(2-PhC$_9$H$_6$)$_2$GdN(SiHMe$_2$)$_2$], 60 μmol of triphenylcarbonium tetrakis(pentafluorophenyl)borate (Ph$_3$CB(C$_6$F$_5$)$_4$) and 720 μmol of diisobutylaluminum halide, which are dissolved in 10 ml of toluene to form a catalyst solution. Then, the catalyst solution is taken out from the glove box and added to the monomer solution to conduct polymerization at 70° C. for 30 minutes. After the polymerization, 10 ml of a 10 mass % solution of 2,6-bis(t-butyl)-4-methyl phenol (BHT) in methanol is added to stop the reaction. The resulting polymer is separated with a greater amount of methanol/hydrochloric acid mixed solvent and dried at 60° C. under vacuum. The yield of the resulting polymer is 31.5 g.

With respect to the polymers of Examples 3-4 produced as mentioned above, the number average molecular weight (Mn), molecular weight distribution (Mw/Mn), microstructure, bound styrene content, blocked styrene content, glass transition point (Tg) and melting point (Tm) are measured by the aforementioned methods. The results are shown in Table 4.

TABLE 4

|  | Example | |
| --- | --- | --- |
|  | 3 | 4 |
| Number average molecular weight (Mn) (×10$^4$) | 15.7 | 10.2 |
| Molecular weight distribution (Mw/Mn) | 2.1 | 2.6 |
| Bound styrene content (wt %) | 12.0 | 18.0 |
| Content of cis-1,4 structure (%) | 93 | 92 |
| Content of vinyl structure (%) | 2.0 | 2.0 |
| Blocked styrene content (%) | 8 | 10 |
| Glass transition point (Tg) (° C.) | −97 | −85 |
| Melting point (Tm) (° C.) | −16 | −17 |

The, a rubber composition having a compounding recipe shown in Table 2 is prepared by using the polymers of Examples 3-4 and vulcanized under normal conditions to obtain a vulcanized rubber. The resistance to wet skid and wear resistance of the vulcanized rubber are measured by the aforementioned methods. The results are shown in Table 5.

TABLE 5

| Property evaluation of rubber composition | | |
| --- | --- | --- |
| Kind of polymer used | Resistance to wet skid (index) | Wear resistance (index) |
| Example 3 | 106 | 104 |
| Example 4 | 111 | 100 |

The invention claimed is:

1. An aromatic vinyl compound-conjugated diene compound copolymer obtained by an addition polymerization of an aromatic vinyl compound and a conjugated diene compound in the presence of a polymerization catalyst composition comprising at least one complex selected from the group consisting of a metallocene complex represented by the following general formula (I):

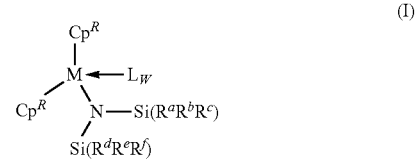

wherein M is a lanthanoid element, scandium or yttrium, Cp$^R$ is independently a non-substituted or substituted indenyl, R$^a$ to R$^f$ are independently an alkyl group having a carbon number of 1-3 or a hydrogen atom, L is a neutral Lewis base, and w is an integer of 0-3;

a metallocene complex represented by the following general formula (II):

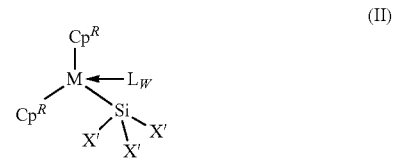

wherein M is a lanthanoid element, scandium or yttrium, Cp$^R$ is independently a non-substituted or substituted indenyl, X' is a hydrogen atom, a halogen atom, an alkoxide group, a thiolate group, an amide group, a silyl group or a hydrocarbon group having a carbon number of 1-20, L is a neutral Lewis base, and w is an integer of 0-3; and a half metallocene complex represented by the following general formula (III):

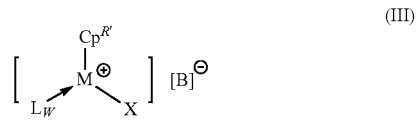

wherein M is a lanthanoid element, scandium or yttrium, Cp$^{R'}$ is a non-substituted or substituted cyclopentadienyl, indenyl or fluorenyl, X is a hydrogen atom, a halogen atom, an alkoxide group, a thiolate group, an amide group, a silyl group or a hydrocarbon group having a carbon number of 1-20, L is a neutral Lewis base, w is an integer of 0-3, and [B]⁻ is a non-coordinate anion, wherein a content of cis-1,4 bond in a conjugated diene compound portion is not less than 80%, and a block quantity of the aromatic vinyl repeating unit portion as measured by NMR is not more than 13% based on the total amount of aromatic vinyl repeating units in the copolymer.

2. The aromatic vinyl compound-conjugated diene compound copolymer according to claim 1, wherein a content of vinyl bond in the conjugated diene compound portion is not more than 10%.

3. The aromatic vinyl compound-conjugated diene compound copolymer according to claim 1, wherein a block quantity of the aromatic vinyl repeating unit portion as measured by NMR is not more than 10% based on the total amount of aromatic vinyl repeating units in the copolymer.

4. The aromatic vinyl compound-conjugated diene compound copolymer according to claim 1, wherein the copolymer has a melting point (Tm) as measured by DSC.

5. The aromatic vinyl compound-conjugated diene compound copolymer according to claim 1, wherein the copolymer is styrene-butadiene copolymer.

6. An aromatic vinyl compound-conjugated diene compound copolymer obtained by polymerizing an aromatic vinyl compound and a conjugated diene compound, wherein a content of cis-1,4 bond in a conjugated diene compound portion is not less than 80%, and a content of vinyl bond in a conjugated diene compound portion is not more than 5%, and a block quantity of the aromatic vinyl repeating unit portion as measured by NMR is not more than 13% based on the total amount of aromatic vinyl repeating units in the copolymer, and a number average molecular weight converted polystyrene as measured by a gel permeation chromatography is not less than 80,000.

7. A rubber composition comprising the aromatic vinyl compound-conjugated diene compound copolymer as claimed in claim 1 as a rubber component.

8. A tire comprising the rubber composition as claimed in claim 7 in any tire member.

9. The tire according to claim 8, wherein the tire member is a tread.

* * * * *